(12) United States Patent
Chao et al.

(10) Patent No.: US 7,765,585 B2
(45) Date of Patent: *Jul. 27, 2010

(54) CREDENTIAL DELEGATION USING IDENTITY ASSERTION

(75) Inventors: Ching-Yun Chao, Austin, TX (US); Hyen Vui Chung, Round Rock, TX (US); Ajay Reddy, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 12/105,257

(22) Filed: Apr. 17, 2008

(65) Prior Publication Data

US 2008/0196097 A1 Aug. 14, 2008

Related U.S. Application Data

(63) Continuation of application No. 10/286,609, filed on Oct. 31, 2002, now Pat. No. 7,526,798.

(51) Int. Cl.
*G06F 7/04* (2006.01)
*G06F 17/00* (2006.01)
*G06F 21/00* (2006.01)
*G06F 9/44* (2006.01)
*H04L 29/06* (2006.01)
*H04L 9/32* (2006.01)

(52) U.S. Cl. ............ 726/5; 726/1; 726/8; 726/12; 726/14; 713/153; 713/161; 713/179; 713/183; 717/102; 717/108; 717/118

(58) Field of Classification Search ............ 726/5, 726/1, 8, 12, 14; 713/153, 161, 179, 183; 717/102, 108, 118
See application file for complete search history.

(56) References Cited

U.S. PATENT DOCUMENTS 5,838,903 A 11/1998 Blakely et al. ............ 726/5

(Continued)

FOREIGN PATENT DOCUMENTS

EP 0924612 A2 6/1999

(Continued)

OTHER PUBLICATIONS

Hatcliff et al., Cadena: an integrated development, analysis, and verification environment for component-based systems, 2003, IEEE, pp. 160-172.

(Continued)

*Primary Examiner*—Aravind K Moorthy
(74) *Attorney, Agent, or Firm*—VanLeeuwen & VanLeeuwen; Justin M. Dillon

(57) ABSTRACT

Run-as credentials delegation using identity assertion is presented. A server receives a request from a client that includes the client's user identifier and password. The server authenticates the client and stores the client's user identifier without the corresponding password in a client credential storage area. The server determines if a run-as command is specified to communicate with a downstream server. If a run-as command is specified, the server retrieves a corresponding run-as identity which identifies whether a client credential type, a server credential type, or a specific identifier credential type should be used in the run-as command. The server retrieves an identified credential corresponding to the identified credential type, and sends the identified credential in an identity assertion token to a downstream server.

6 Claims, 7 Drawing Sheets

U.S. PATENT DOCUMENTS

| | | | |
|---|---|---|---|
| 6,088,451 A | 7/2000 | He et al. | 726/8 |
| 6,216,101 B1 | 4/2001 | Butts et al. | 703/27 |
| 6,279,111 B1 | 8/2001 | Jensenworth et al. | 713/200 |
| 6,286,104 B1 | 9/2001 | Buhle et al. | 726/4 |
| 6,308,273 B1 | 10/2001 | Goertzel et al. | 713/201 |
| 6,308,274 B1 | 10/2001 | Swift | 713/201 |
| 6,965,939 B2 | 11/2005 | Cuomo et al. | 709/229 |
| 7,020,645 B2 | 3/2006 | Bisbee et al. | 707/1 |
| 7,231,661 B1 | 6/2007 | Villavicencio et al. | 726/4 |
| 2002/0049916 A1* | 4/2002 | Nozaki et al. | 713/202 |
| 2003/0005308 A1 | 1/2003 | Rathbun et al. | 713/185 |
| 2003/0074580 A1 | 4/2003 | Knouse et al. | 713/201 |
| 2003/0236975 A1 | 12/2003 | Birk et al. | 713/156 |
| 2004/0015839 A1 | 1/2004 | Sarkar et al. | 717/108 |
| 2004/0103199 A1 | 5/2004 | Chao et al. | 709/228 |
| 2006/0037064 A1* | 2/2006 | Jeffries et al. | 726/4 |
| 2006/0101510 A1* | 5/2006 | Kadyk et al. | 726/12 |
| 2006/0130140 A1* | 6/2006 | Andreev et al. | 726/23 |
| 2007/0027700 A1* | 2/2007 | Ahamparam et al. | 705/1 |
| 2007/0174905 A1 | 7/2007 | Martherus et al. | 726/8 |
| 2008/0046993 A1* | 2/2008 | Mullick et al. | 726/15 |
| 2008/0072303 A1* | 3/2008 | Syed | 726/10 |
| 2008/0077857 A1* | 3/2008 | Olson | 715/246 |
| 2008/0189778 A1* | 8/2008 | Rowley | 726/9 |
| 2009/0125997 A1* | 5/2009 | Cook | 726/6 |
| 2009/0138703 A1* | 5/2009 | Schneider | 713/155 |
| 2009/0150981 A1* | 6/2009 | Amies et al. | 726/5 |

FOREIGN PATENT DOCUMENTS

| | | |
|---|---|---|
| WO | WO 02086738 A1 | 10/2002 |
| WO | WO 2004023345 A1 | 3/2004 |

OTHER PUBLICATIONS

Bin et al., An automatically dynamic checking tool for Java Beans semantic constraints, 1998, IEEE, pp. 164-172.

Gritzalis et al., Distributed component software security issues on deploying a secure electronic marketplace, 2000, Library Computing.

Centonze et al., Role-based access control consistency validation, 2006, ACM, pp. 121-131.

* cited by examiner

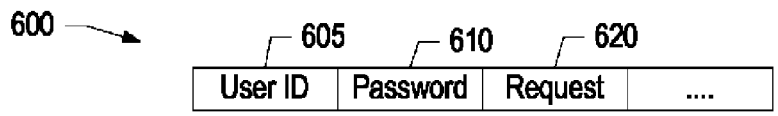
Figure 6A-Client Request
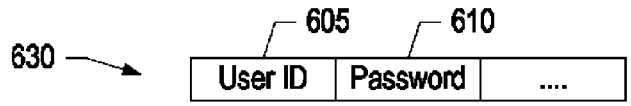
Figure 6B- Authentication Request
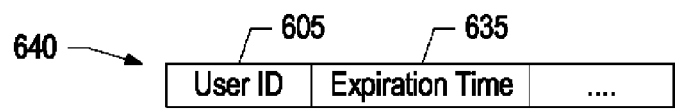
Figure 6C- Authentication Token
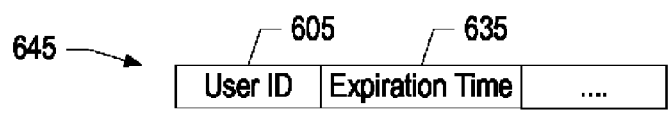
Figure 6D- Client Credential
Figure 6E- Server Credential
Figure 6F- Specific ID Credential
Figure 6G- Invocation Credential
Figure 6H- IA Token

CREDENTIAL DELEGATION USING IDENTITY ASSERTION

RELATED APPLICATIONS

This application is a continuation application of co-pending U.S. Non-Provisional patent application Ser. No. 10/286,609, entitled "System and Method for Credential Delegation Using Identity Assertion," filed on Oct. 31, 2002, and issued as U.S. Pat. No. 7,526,798 on Apr. 28, 2009.

BACKGROUND OF THE INVENTION

1. Technical Field

The present invention relates in general to a system and method for supporting run-as credentials delegation using identity assertion. More particularly, the present invention relates to a system and method for storing a user identifier without a corresponding password on a server, inserting the user identifier in an identity assertion token, and using a run-as command to send the identity assertion token to a downstream server.

2. Description of the Related Art

Businesses are increasingly dependent upon using computer systems for business activities. A computer system compromise in terms of information loss, information inaccuracy, or an information security breach may be costly to a business. Security breaches are becoming more frequent and may be due to accidental misuse of a computer system, such as a user accidentally gaining unauthorized access to information. However, security breaches may also be due to malicious attacks by computer hackers to gain access to sensitive information.

Distributed computer systems are more vulnerable to security breaches than more traditional computer systems since distributed computer systems include more areas from which the computer system may be attacked. Computer security systems typically focus on four main areas to protect a computer system from unauthorized access attempts. These four areas are confidentiality, integrity, accountability, and availability. Confidentiality ensures that information is disclosed only to authorized users. Integrity ensures that only authorized users are able to modify information using authorized ways. Accountability ensures that users are accountable for their security-relevant actions, such as non-repudiation. Availability ensures that users may not be maliciously denied access.

Object Management Group (OMG) is an organization that establishes industry guidelines and object management specifications to provide a common framework for application development. OMG has developed specifications that particularly focus on network security. One such specification is the Common Security Interoperability version 2 (CSIv2) document which defines various levels of security architectures between computer systems. A developer follows CSIv2 security architecture definitions in order to ensure interoperability with other computer systems.

The CSIv2 document includes a definition for a security protocol called Security Attribute Service (SAS). The SAS protocol specifies how to exchange protocol elements that are communicated over a connection-based transport. The SAS protocol is intended to be used in environments where transport layer security is used to provide message protection (i.e. integrity and/or confidentiality) and server-to-client authentication. The SAS protocol provides client authentication, delegation, and privilege functionality that may be applied to overcome corresponding deficiencies in an underlying transport. For example, a SSL/TLS protocol does not enforce client authentication and, in a given environment, certificate-based client authentication may not be feasible since clients often do not have a certificate. The SAS protocol facilitates interoperability by serving as a higher-level protocol under which secure transports may be unified.

In a Java-based application, enterprise Java beans (EJB's) use the SAS protocol to communicate with other EJB's. EJB 2.0 is a document that specifies EJB characteristics and requires a server to propagate a security identity of either a requesting client or another specified identity to a downstream server. EJB 2.0 specifies a run-as command which allows a server to send a downstream request using a client's identity, a server's identity, or a specific pre-defined identity (see EJB 2.0 for further details).

For example, a developer may define a bean with several privileged administrative tasks (i.e. administrative bean). The developer may then define two different beans (i.e. interface beans) that make use of the administrative bean. The two interface beans may be assigned different run-as identities with varying degrees of access, enabling reuse of the administrative bean without compromising the secure access to its secure functions. A challenge found is that the propagating server stores a user identifier and its corresponding password in order to support EJB 2.0. Storing the identifier and password poses security issues.

Servlet 2.3 is a document that specifies servlet characteristics. Servlet 2.3 requires that a server propagate a security identity of either a requesting client or another specified identity to a downstream server when a servlet is invoking an EJB in the downstream server. A challenge found is that the propagating server stores a user identifier and its corresponding password in order to support Servlet 2.3. Again, storing the identifier and the password poses a security issue.

What is needed, therefore, is a way to support security protocol standards without storing a client's password on a sending server.

SUMMARY

It has been discovered that the aforementioned challenges are resolved by storing a user identifier without a corresponding password on a server, inserting the user identifier in an identity assertion token, and using a run-as command to send the identity assertion token to a downstream server.

A client sends a request to a server which includes the client's user identifier and password. For example, the client may send a request to the server inquiring about the client's bank account. The server receives the request, and sends the user identifier/password combination to a security service. The security service may be a server that is responsible for authenticating clients. The security service authenticates the client by retrieving a stored valid password from a look-up table which corresponds to the user identifier, and matches the stored valid password with the client supplied password. If the two passwords match, the security service sends a token to the server which includes the client's user identifier. The server receives the token and stores the token in a client credential storage area.

Once the client is authenticated, the server processes a request portion of the client's request. Using the example described above, once the server authenticates the client, the server processes the bank account request. The server analyzes the request, and determines whether the server should process the request or whether the request should be processed by a downstream server.

When the server determines that a downstream server should process the request, the server determines whether a run-as command is specified to send the request to the downstream server. If a run-as command is specified, the server invokes the run-as command and retrieves a run-as identity from a security data configuration corresponding to a particular enterprise Java bean. The run-as identity identifies whether a client credential type, a server credential type, or a specific identifier credential type should be included in an invocation credential. The server retrieves an identified credential corresponding to the identified credential type, and stores the identified credential in the invocation credential. The server includes the invocation credential in an identity assertion token and sends the identity assertion token to the downstream server for processing. The downstream server receives the identity assertion token and processes the request included in the invocation credential.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIGS. 6A-6H are various data packets that servers and clients use to transfer information on a computer network.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
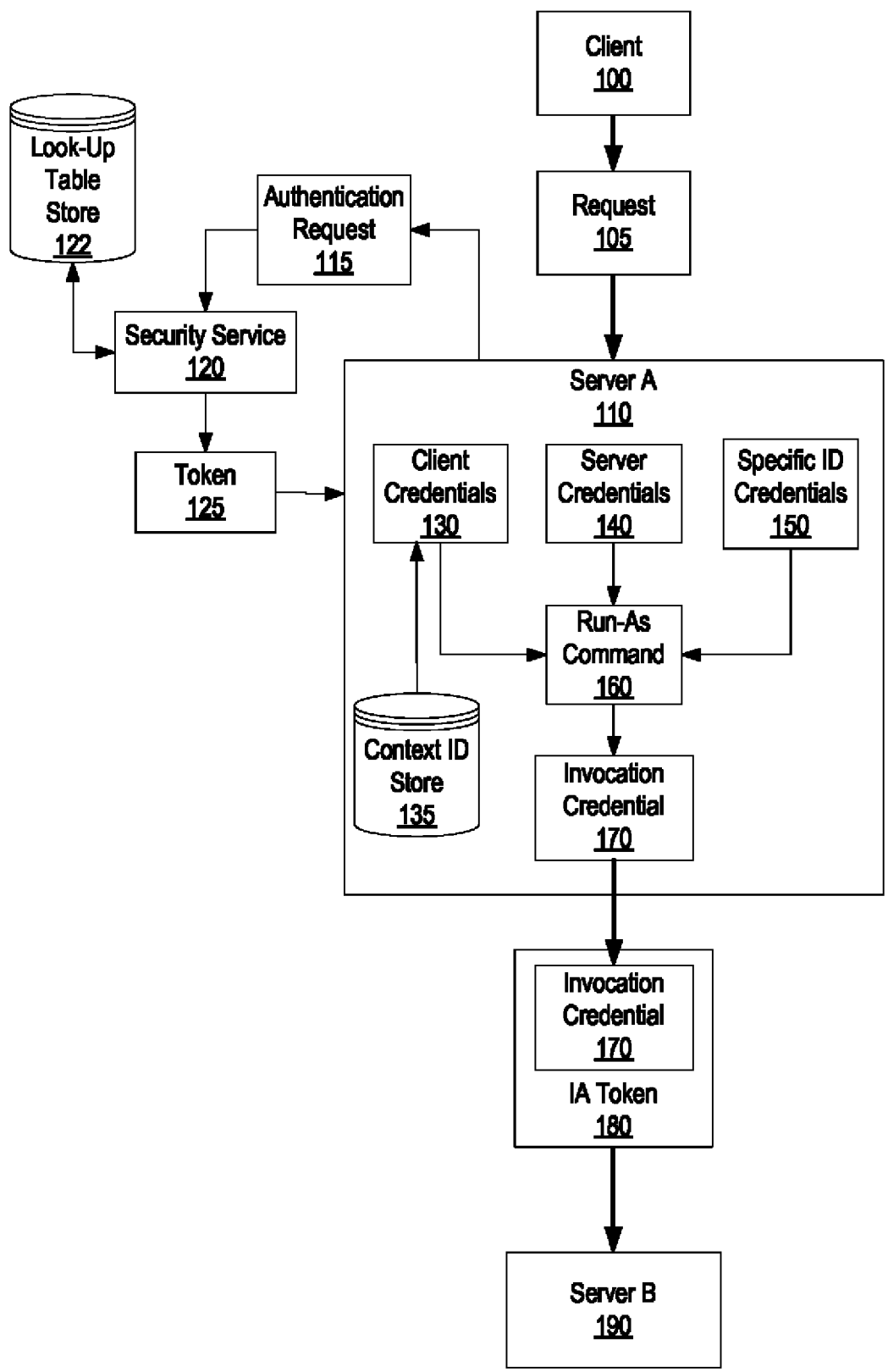
FIG. 1 is a high-level diagram showing a client sending a request to a server and the server processing the client's request.

FIG. 1 is a high-level diagram showing a client sending a request to a server, such as server A 110, and the server processing the client's request. Client 100 sends request 105 to server A 110. Request 105 is a client request includes client 100's user identifier and password (see FIG. 6A and corresponding text for further details regarding client request content). For example, client 100 may send a request to server A 110 inquiring about client 100's bank account.

Server A 110 includes the user identifier/password combination in authentication request 115, and sends authentication request 115 to security service 120 (see FIG. 6B and corresponding text for further details regarding authentication request content). Security service 120 may be a server that is responsible for authenticating clients. Security service 120 authenticates client 100 by retrieving a stored valid password from look-up table store 122 which corresponds to the user identifier, and matches the retrieved valid password with the client supplied password included in authentication request 115. Look-up table store 122 may be stored on a non-volatile storage area, such as a computer hard drive. If the two passwords match, security service 120 sends token 125 which is an authentication token to server A 110 (see FIG. 6C and corresponding text for further details regarding authentication token content). Server A 110 receives token 125 which includes client 100's user identifier and stores token 125 in client credentials 130 (see FIG. 6D and corresponding text for further details regarding client credential content). Token 125 is an authentication token corresponding to client 100's identity in a format known by a specific mechanism, such as Kerberos, LTPA, or LocalOS. If security service 120 is unable to authenticate client 100, security service 120 sends an error message to server A 110.

Once server A 110 authenticates client 100, server A 110 processes a request portion of request 105. Using the example described above, once server A 110 authenticates client 100, server A 110 processes client 100's bank account request. Server A 110 analyzes the request, and determines whether server A 110 should process the request or whether the request should be processed by a downstream server, such as server B 190.

If server A 110 determines that request 105 should be processed by a downstream server, server A 110 determines whether a run-as command is specified to send requests to server B 190. If a run-as command is specified, server A 110 invokes run-as command 160. Run-as command 160 retrieves a run-as identity from a security data configuration corresponding to a particular enterprise Java bean. The run-as identity identifies whether a client credential type, a server credential type, or a specific identifier credential type should be included in invocation credential 170. If the run-as identity specifies a client credential type, run-as command 160 retrieves information from client credentials 130, such as client 100's user identifier, and stores the information in invocation credential 170 (see FIG. 6G and corresponding text for further details regarding invocation credential content). On the other hand, if the run-as identity specifies a server credential type, run-as command 160 retrieves information from server credentials 140 which includes server A 110's identification, and stores the information in invocation credential 170 (see FIG. 6E and corresponding text for further details regarding server credential content). On the other hand, if the run-as identity specifies a specific identifier credential type, run-as command 160 retrieves information from specific identifier credentials 150 and stores the information in invocation credential 170 (see FIG. 6F and corresponding text for further details regarding specific identifier credential content). Specific identifier credentials 150 include credential information using a pre-defined identity. For example, a specific identifier may be used in an invocation credential when a developer defines two interface beans that make use of an administrative bean wherein the two interface beans have different run-as identities with varying degrees of access. In this example, a specific identifier may be used to access the administrative bean by associating the specific identifier to one of the interface beans.

Server A 110 inserts invocation credential 170 in identity assertion token 180. Identity assertion token 180 may be generated using guidelines specified in Object Management Group (OMG) documentation (see FIG. 6H and corresponding text for further details regarding identity assertion token content). Server A 110 sends identity assertion token 180 to server B 190 for processing. Server B 190 receives identity assertion token 180 and processes the request included in invocation credential 170. Using the example described above, server B 190 processes client 100's bank account request.

Figure 2:
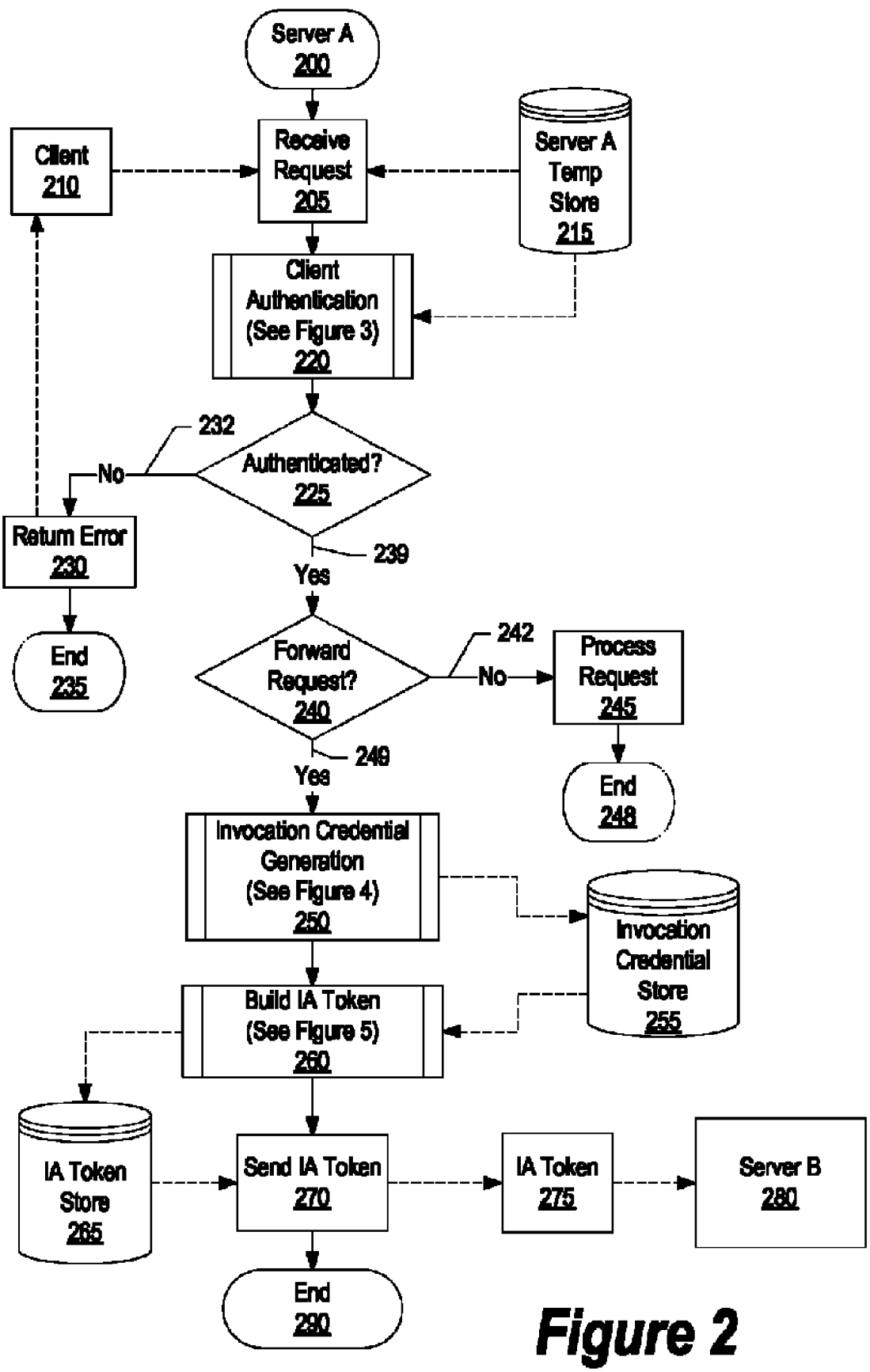
FIG. 2 is a high-level flowchart showing steps taken in a first server authenticating a client and forwarding a client's request to a second server.

FIG. 2 is a high-level flowchart showing steps taken in a first server authenticating a client and forwarding a client's request to a downstream server. Server A processing commences at 200, whereupon server A receives a request from client 210 and stores the request in server A temporary store 215 (step 205). For example, client 210 may be sending a request to server A requesting bank account information. The request may include a client's user identifier and a corresponding password for authentication purposes (see FIG. 6A and corresponding text for further details regarding client request content). Server A temporary store 215 may be stored in a non-volatile storage area, such as a computer hard drive, or a volatile storage area, such as random access memory (RAM). Server A performs authentication steps to authenticate client 210 (pre-defined process block 220, see FIG. 3 and corresponding text for further details).

A determination is made as to whether client 210 was authenticated (decision 225). If client 210 was not authenticated, decision 225 branches to "No" branch 232 whereupon an error is returned to client 210 (step 230) and processing ends at 235. On the other hand, if client 210 is authenticated, decision 225 branches to "Yes" branch 239 whereupon a determination is made as to whether client 210's request should be processed by server A or should be forwarded to a downstream server (decision 240). Using the example described above, processing determines whether server A is the server that processes bank account requests or whether a downstream server should process bank account requests.

If server A is the correct server to process client 210's request, decision 240 branches to "No" branch 242 whereupon server A process client 210's request at step 245, and processing ends at 248. On the other hand, if client 210's request should be forwarded to a downstream server, decision 240 branches to "Yes" branch 249.

Figure 4:
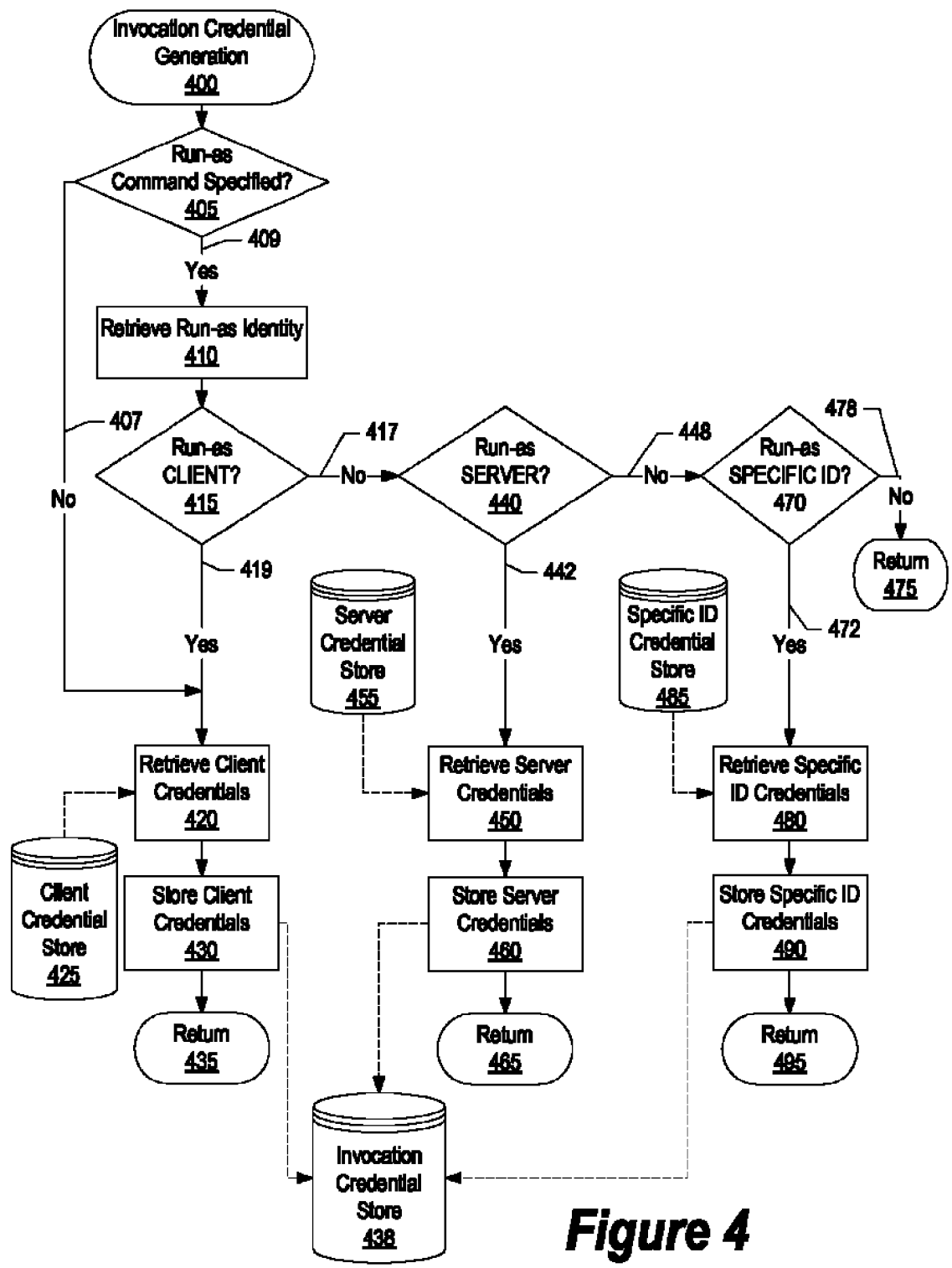
FIG. 4 is a flowchart showing steps taken in identifying a credential type to send to a server and storing a credential corresponding to the identified credential type in a storage area.

Server A processing generates an invocation credential corresponding to client 210's request which includes either client 210's user identifier (e.g. client credential), a server credential, or a specific identifier credential, and stores the invocation credential in invocation credential store 255 (pre-defined process block 250, see FIG. 4 and corresponding text for further details). Invocation credential store 255 may be stored in a non-volatile storage area, such as a computer hard drive, or a volatile storage area, such as random access memory (RAM).

Figure 5:
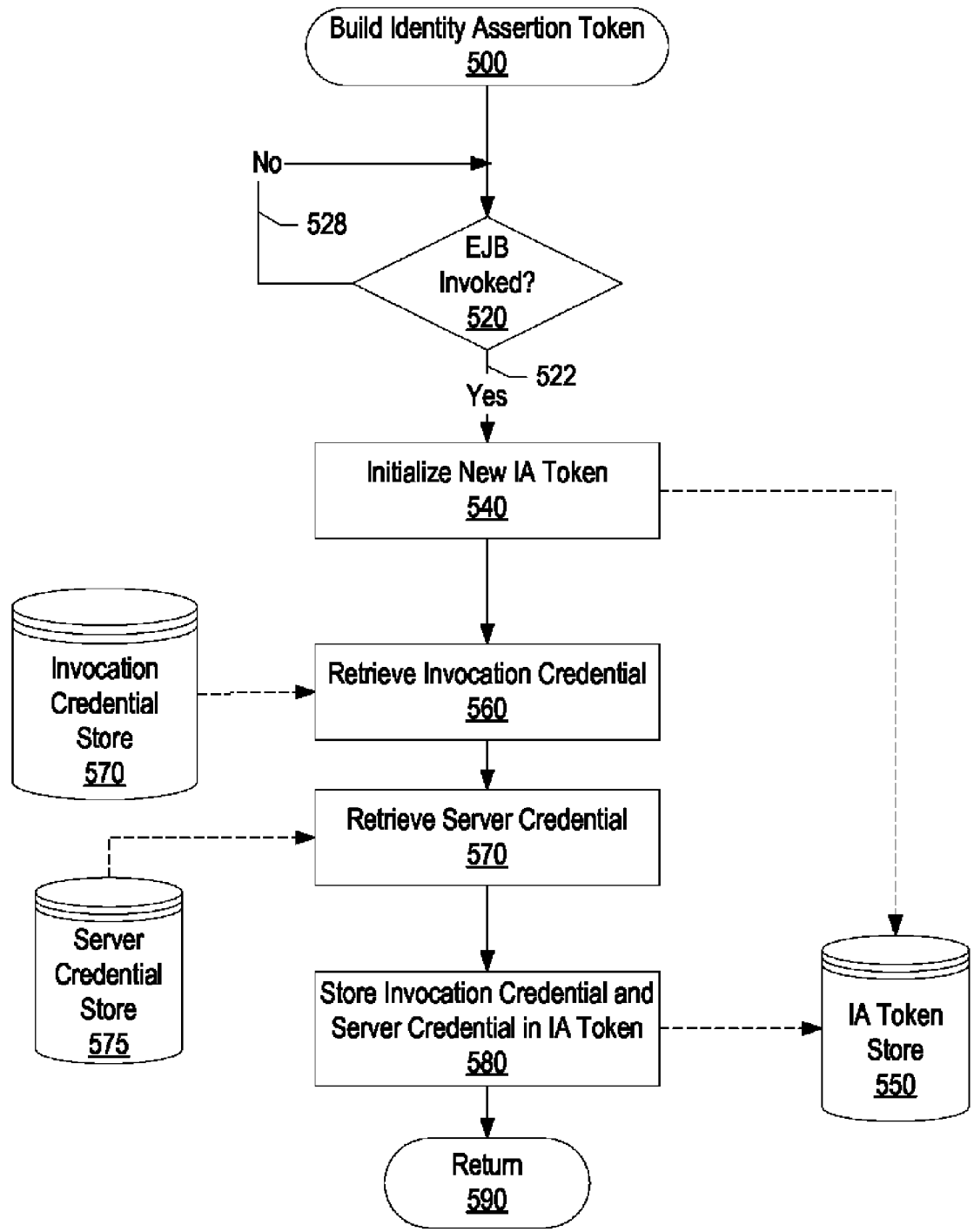
FIG. 5 is a flowchart showing steps taken in building an identity assertion token using an identified credential type.

Server A creates an identity assertion token using the stored credential in invocation credential store 255, and stores the identity assertion token in identity assertion token store 265 (pre-defined process block 260, see FIG. 5 and corresponding text for further details). An identity assertion token includes an invocation credential as well as server A's authentication information (see FIG. 6H and corresponding text for further details regarding identity assertion token content). A downstream server, such as server B 280, uses server A's authentication information in the identity assertion token to establish a trust between server A and the downstream server. Identity assertion token store 265 may be stored on a non-volatile storage area, such as a computer hard drive, or a volatile storage area, such as random access memory (RAM).

Server A retrieves the identity assertion token from identity assertion token store 265 at step 270, and sends identity assertion token 275 to server B 280. Using the example described above, server A sends client 210's request to server B 280 to process client 210's bank account request. Processing ends at 290.

Figure 3:
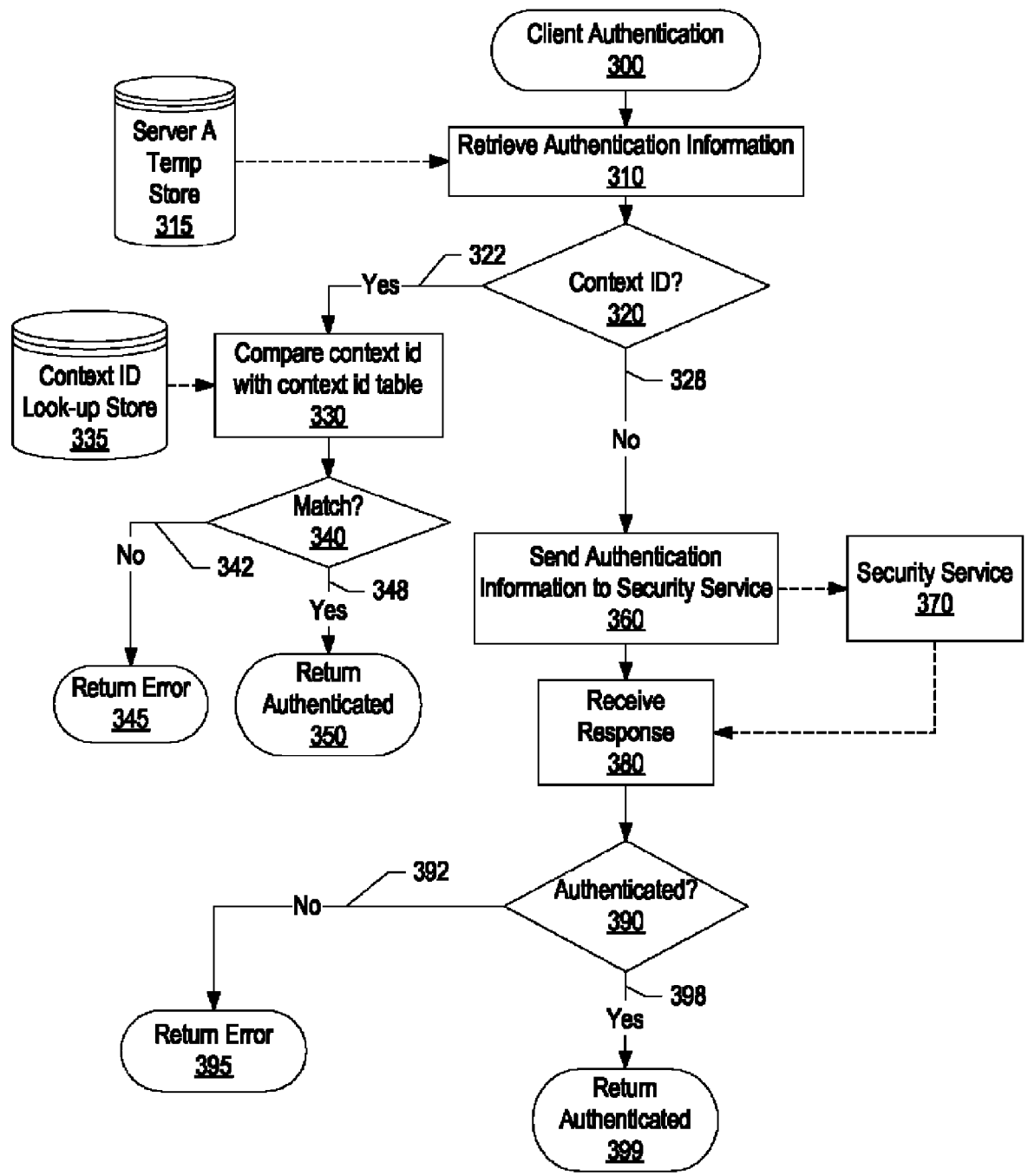
FIG. 3 is a flowchart showing steps taken in authenticating a client.

FIG. 3 is a flowchart showing steps taken in authenticating a client. Client authentication processing commences at 300, whereupon processing retrieves authentication information corresponding to a client from server A temporary store 315. Server A temporary store 315 may be stored on a non-volatile storage area, such as a computer hard drive. For example, authentication information may include a user identifier and a password. A determination is made as to whether the authentication information is a context identifier which indicates that the client has been previously authenticated (decision 320). If the authentication information includes a context identifier, decision 320 branches to "Yes" branch 322 whereupon processing compares the context identifier with a context identifier look-up table located in context identifier look-up store 335. A context identifier includes a user identifier, a password, and a context identifier flag to inform the server that the client has been previously authenticated. Context identifier look-up store 335 may be stored in a non-volatile storage area, such as a computer hard drive.

A determination is made as to whether processing matched the client's context identifier with a context identifier in the context identifier look-up table (decision 340). If processing did not match the client's context identifier, decision 340 branches to "No" branch 342 whereupon processing returns an error message at 345. On the other hand, if processing matched the client's context identifier, decision 340 branches to "Yes" branch 348 whereupon processing returns an authentication message at 350.

If the client's authentication information is not a context identifier, decision 320 branches to "No" branch 328 whereupon processing sends the authentication information to security service 370 at step 360 (see FIG. 6B and corresponding text for further details regarding authentication request content). Using the example described above, the user identifier and password are sent to security service 370. Security service 370 may be a server that is responsible for authenticating clients. The authentication information may be encrypted if a Secure Sockets Layer (SSL) protocol is used to transmit the authentication information on a computer network to security service 370. If a protocol such as TCP/IP is used to transmit the authentication information on a computer network to security service 370, the authentication information is not encrypted.

Processing receives a response from security service 370 at step 380. If security service authenticated the client, the response is an authentication token (see FIG. 6C and corresponding text for further details regarding authentication token content). If the security service did not authenticate the client, the response is a "Not Authenticated" message. A determination is made as to whether security service 370 authenticated the client (decision 390). If the client was not authenticated, decision 390 branches to "No" branch 392 whereupon an error message is returned at 395. On the other hand, if the client was authenticated, decision 390 branches to "Yes" branch 398 whereupon an authentication message is returned at 399.

FIG. 4 is a flowchart showing steps taken in identifying a credential type to send to a downstream server and storing a credential corresponding to the identified credential type in a storage area (see FIG. 6G and corresponding text for further details regarding invocation credential content). Invocation credential processing commences at 400, whereupon a determination is made as to whether processing specifies a run-as command that identifies which credential type to send to the downstream server (decision 405). If a run-as command is not specified, decision 405 branches to "No" branch 407, bypassing run-as credential type determination steps and using a client credential type as a default.

Processing retrieves a client's credentials from client credential store 425 at step 420. The client's credentials include the client's user identifier but do not include the client's password (see FIG. 6D and corresponding text for further details regarding client credential content). Client credential store 425 may be stored on a non-volatile storage area, such as a computer hard drive, or a volatile storage area, such as Random Access Memory (RAM). Processing stores the client's credentials in invocation credential store 438 at step 430. Invocation credential store 438 may be stored on a non-volatile storage area, such as a computer hard drive, or a volatile storage area, such as Random Access Memory (RAM) Processing returns at 435.

If a run-as command is specified, decision 405 branches to "Yes" branch 409 whereupon a run-as identity is retrieved from a security data configuration corresponding to a particular enterprise Java bean. A determination is made as to whether processing should use a client credential type for an upcoming identity assertion token that will be sent to a forwarding server (decision 415). If the run-as identity specifies a client credential type, decision 415 branches to "Yes" branch 419 whereupon processing processes client credential retrieval and storage steps 420-435, as described above.

On the other hand, if the run-as identity does not specify a client credential type, decision 415 branches to "No" branch 417 whereupon a determination is made as to whether the run-as identity specifies a server credential type (decision 440). If the run-as identity specifies a server credential type, decision 440 branches to "Yes" branch 442. Processing retrieves server credentials corresponding to the processing server (i.e. upstream server) from server credential store 455 at step 450 (see FIG. 6E and corresponding text for further details regarding server credential content). Server credential store 455 may be stored on a non-volatile storage area, such as a computer hard drive, or a volatile storage area, such as Random Access Memory (RAM). The server credentials are stored in invocation credential store 438 at step 460, and processing returns at 465.

If the run-as identity does not specify a server credential type, decision 440 branches to "No" branch 448 whereupon a determination is made as to whether processing should use a pre-defined specific identifier for an upcoming identity assertion token (decision 470). For example, a developer may define a Java bean with several privileged administrative tasks (i.e. administrative bean). The developer may then define two different Java beans (i.e. interface beans) that make use of the administrative bean. The two interface beans may be assigned different run-as identities with varying degrees of access, enabling reuse of the administrative bean without compromising the secure access to its secure functions. In this example, a specific identifier may be used to access the administrative bean by corresponding the specific identifier to one of the interface beans.

If processing should not use a pre-defined specific identifier for an upcoming identity assertion token, decision 470 branches to "No" branch 478 whereupon processing returns at 475. On the other hand, if processing should use a pre-defined specific identifier, decision 470 branches to "Yes" branch 472. Processing retrieves specific identifier credentials from specific identifier credential store 485 at step 480 (see FIG. 6F and corresponding text for further details regarding specific identifier credential content). Specific identifier credential store 485 may be stored on a non-volatile storage area, such as a computer hard drive, or a volatile storage area, such as Random Access Memory (RAM). The specific identifier credentials are stored in invocation credential store 438 at step 490, and processing returns at 495.

FIG. 5 is a flowchart showing steps taken in building an identity assertion token using an identified credential type. Identity assertion processing commences at 500, whereupon a determination is made as to whether an enterprise Java bean has been invoked (decision 520). The enterprise Java bean may be either a session bean or an entity bean. An entity bean typically represents a row in a relational database. For example, if a server has a customer bank account table that represents each customer's bank account, the server may have an entity bean instance for each bank account. A session bean typically represents business-level logic that an application requires to execute. For example, a single session bean may confirm a customer's credit card number, charge the customer's credit card, and generate an email to a shipping department to fulfill the customer's order.

If processing has not invoked an enterprise Java bean, decision 520 branches to "No" branch 528 which loops back to wait for an enterprise Java bean. This looping continues until an enterprise Java bean is invoked, at which point decision 520 branches to "Yes" branch 522. Processing initializes a new identity assertion token in identity assertion token store 550 at step 540. The initialization process involves allocating memory for a new identity assertion token. Identity assertion token store 550 may be stored on a non-volatile storage area, such as a computer hard drive, or a volatile storage area, such as random access memory (RAM).

An invocation credential is retrieved from invocation credential store 570 which includes an identified credential (step 560). The identified credential may be a client credential, a server credential, or a specific identity credential (see FIG. 4 and corresponding text for further details regarding credential types). Invocation credential store 570 may be stored on a non-volatile storage area, such as a computer hard drive, or a volatile storage area, such as random access memory (RAM).

The processing server's credential (i.e. upstream server) is retrieved from server credential store 575 at step 570. A downstream server uses the processing server's credential to authenticate the processing server and establish a trust with the processing server. Once a downstream server trusts the processing server, the downstream server receives the processing server's invocation credential and assumes the invocation credential is valid.

Processing stores the invocation credential and the server credential in an identity assertion token in identity assertion token store 550 at step 580 (see FIG. 6H and corresponding text for further details regarding identity assertion token content). Processing then sends the identity assertion token to a downstream server for further processing (see FIGS. 1, 2, and corresponding text for further details regarding sending identity assertion tokens downstream). Processing returns at 590.

FIGS. 6A-6H are various data packets that servers and clients use to transfer information on a computer network. Data packets shown in FIGS. 6A-6H may be encrypted if Secure Sockets Layer (SSL) protocol is used to transmit the data packets on the computer network. If a protocol such as TCP/IP is used to transmit the data packets on the computer network, the data packets are not encrypted.

FIG. 6A shows a client request, such as client request 600, that a client sends to a server. Client request 600 includes user identifier 605, password 610, and request 620. User identifier 605 corresponds to the client's identification and password 610 corresponds to user identifier 605. Request 620 includes the client's request to a server.

FIG. 6B shows an authentication request, such as authentication request 630, that a server sends to a security service in order to authenticate a client. Authentication request 630 includes user identifier 605 and password 610. User identifier 605 and password 610 are the same user identifier and password that a client previously sent to the server in a client request (see FIG. 6A and corresponding text for further details regarding client requests content).

FIG. 6C shows an authentication token, such as authentication token 640, that a security service returns to a server that previously sent an authentication request (see FIG. 6B and corresponding text for further details regarding authentication request content). Authentication token 640 includes user identifier 605 and expiration time 635. User identifier 605 corresponds to the user identifier included in the server's authentication request. Expiration time 635 includes a time at which authentication token 640 expires.

FIG. 6D shows a client credential, such as client credential 645, in which a server generates and corresponds to a client request. Client credential 645 includes user identifier 605 and expiration time 635. User identifier 605 corresponds to a user identifier included in an authentication token (see FIG. 6C and corresponding text for further details regarding authentication token content).

FIG. 6E shows a server credential, such as server credential 650, that a server creates in order to support a run-as command wherein the run-as command specifies a server credential (see FIG. 4 and corresponding text for run-as command specifications). Server credential 650 includes server identifier 655 which corresponds to the identity of the server creating the credential.

FIG. 6F shows a specific identifier credential, such as specific identifier credential 660, that a server uses to support a run-as command wherein the run-as command specifies a specific identifier credential (see FIG. 4 and corresponding text for run-as command specifications). Specific identifier 660 corresponds to a user identifier previously received, such as a system administrator's user identifier.

FIG. 6G shows an invocation credential, such as invocation credential 670, in which a server creates in preparation of sending a request to a downstream server. Invocation credential 670 includes selected credential 675 which may be a user identifier, such as user identifier 605 shown in FIG. 6D, a server identifier, such as server identifier 655 shown in FIG. 6E, or a specific identifier, such as specific identifier 665 shown in FIG. 6F. The server uses a run-as command specification to determine which identifier to include in selected credential 675 (see FIG. 4 and corresponding text for further details regarding invocation credential generation).

FIG. 6H shows an identity assertion token, such as identity assertion token 680, that a server uses to send a request to a downstream server. Identity assertion token 680 includes selected credential 675, server identifier 655, and request 690. Selected credential 675 is retrieved from a previously generated invocation credential, such as invocation credential 670 shown in FIG. 6G. Server identifier 655 corresponds to the identity of a sending server and is similar to a server identifier that the sending server includes in the sending server's server credential, such as server identifier 655 shown in FIG. 6F. The downstream server uses server identifier 655 to authenticate the sending server.

Request 690 includes a request from the sending server to the downstream server. Request 290 may be the same as a request that the sending server previously received from a client, such as request 620 shown in FIG. 6A. Request 690 may also relate to a client's request but may not be the same request. For example, if a client's request is to access bank account information, the server may have access to some of the client's bank account information (i.e. account balances), but may send a request to a downstream server to access more detail information, such as bank account transaction history (see FIGS. 1, 2, and corresponding text for further details regarding identity assertion token generation and transmission).

Figure 7:
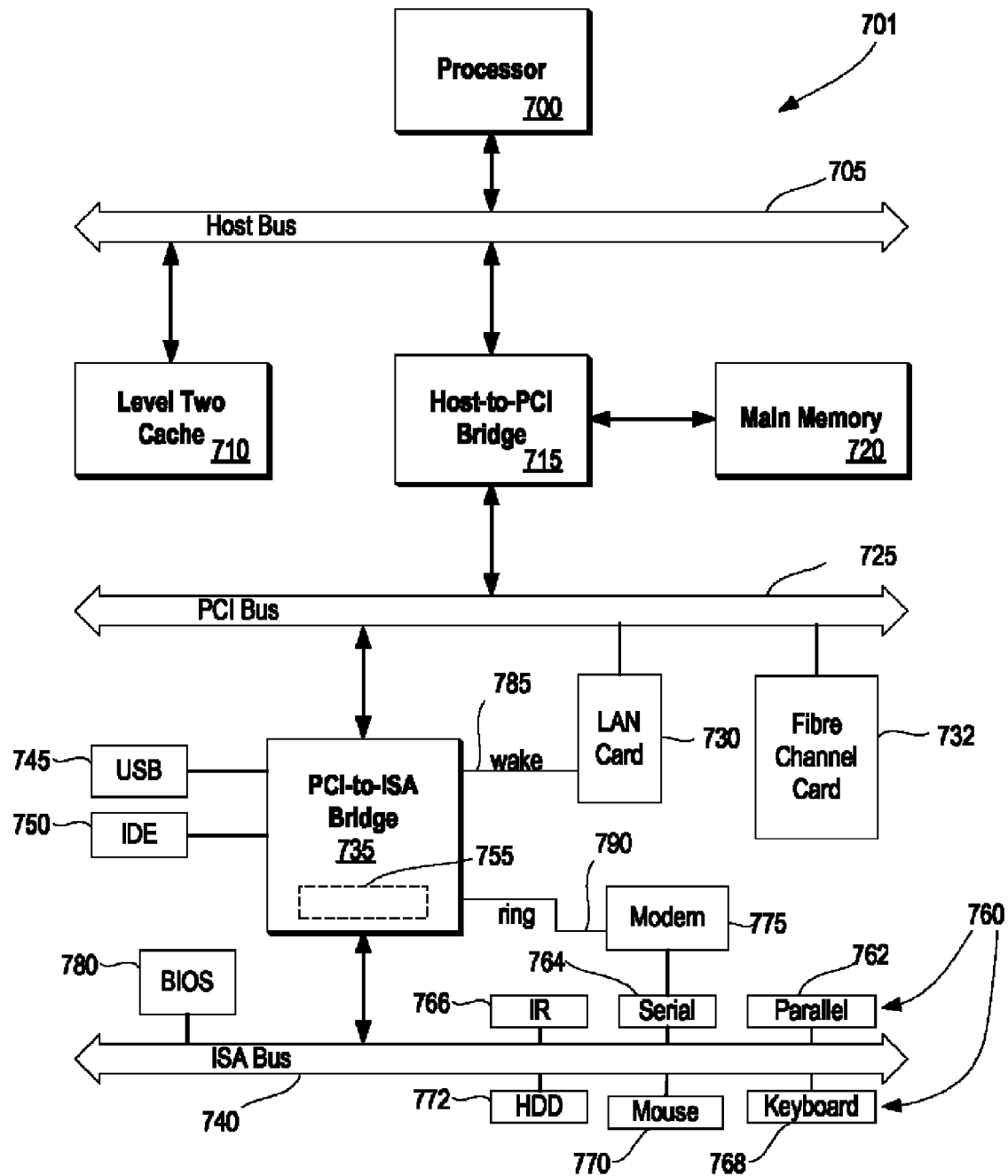
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by the processors;
   one or more nonvolatile storage devices accessible by the processors;
   a network security tool to handle network security, the network security tool including:
   means for receiving, at a first server, a client request from a client, wherein the client request includes a user identifier and a password;
   means for authenticating the client request using a security service, wherein the security service is different than the first server;
   in response to authenticating the client request, means for sending an authentication token from the security service to the first server;
   in response to receiving the authentication token at the first server, means for storing the user identifier without the password in a client credential located in one of the nonvolatile storage devices located at the first server, wherein the client credential corresponds to a client credential type;
   after receiving the authentication token from the security service, means for determining that a run-as command is specified that allows the first server to send an identity assertion token to a downstream server using a different identity, wherein the different identity is based upon a credential type that is selected from the group consisting of the client credential type, a server credential type, and a specific identifier credential type;
   in response to determining that the run-as command is specified, means for selecting, at the first server, one of the credential types;
   means for determining whether an enterprise Java bean has been invoked;
   in response to determining that the enterprise Java bean has been invoked, means for generating the identity assertion token using an identified credential which corresponds to the selected credential type; and
   means for sending the identity assertion token from the first server directly to the downstream server.

2. The information handling system as described in claim 1 further comprising:
   means for selecting the client credential as the identified credential.

3. The information handling system as described in claim 1 wherein the identity assertion token includes the identified credential and a server credential.

4. A computer program product stored on a computer readable medium, the computer readable medium containing instructions for execution by a computer, which, when executed by the computer, cause the computer to implement a method comprising:
   receiving, at a first server, a client request from a client, wherein the client request includes a user identifier and a password;
   authenticating the client request using a security service, wherein the security service is different than the first server;
   in response to authenticating the client request, sending an authentication token from the security service to the first server;
   in response to receiving the authentication token at the first server, storing the user identifier without the password in a client credential at the first server, wherein the client credential corresponds to a client credential type;
   after receiving the authentication token from the security service, determining that a run-as command is specified that allows the first server to send an identity assertion token to a downstream server using a different identity, wherein the different identity is based upon a credential type that is selected from the group consisting of the client credential type, a server credential type, and a specific identifier credential type;
   in response to determining that the run-as command is specified, selecting, at the first server, one of the credential types;
   determining whether an enterprise Java bean has been invoked;
   in response to determining that the enterprise Java bean has been invoked, generating the identity assertion token using an identified credential which corresponds to the selected credential type; and
   sending the identity assertion token from the first server directly to the downstream server.

5. The computer program product as described in claim 4 wherein the method further comprises:
   selecting the client credential as the identified credential.

6. The computer program product as described in claim 4 wherein the identity assertion token includes the identified credential and a server credential.

* * * * *